Dec. 11, 1923.
W. D. DEWEND
AGRICULTURAL IMPLEMENT
Original Filed June 22, 1921
1,476,879
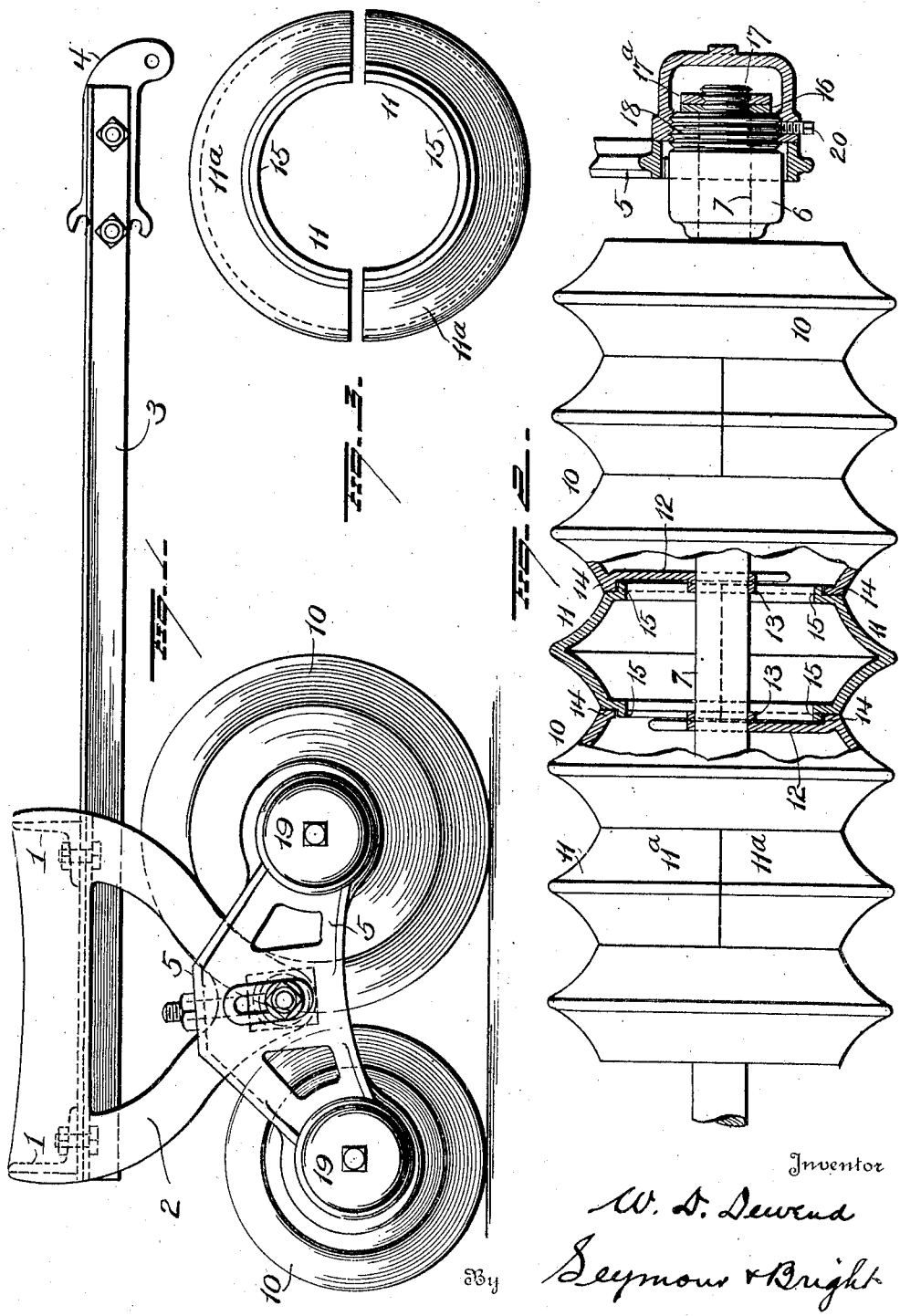

Patented Dec. 11, 1923.

1,476,879

UNITED STATES PATENT OFFICE.

WILLIAM D. DEWEND, OF SOUTH BEND, INDIANA, ASSIGNOR TO OLIVER CHILLED PLOW WORKS, OF SOUTH BEND, INDIANA.

AGRICULTURAL IMPLEMENT.

Original application filed June 22, 1921, Serial No. 479,610. Divided and this application filed February 13, 1922. Serial No. 536,147.

*To all whom it may concern:*

Be it known that I, WILLIAM D. DEWEND, a citizen of the United States, and a resident of South Bend, in the county of St. Joseph and State of Indiana, have invented certain new and useful Improvements in Agricultural Implements; and I do hereby declare the following to be a full, clear, and exact description of the invention, such as will enable others skilled in the art to which it appertains to make and use the same.

This invention relates to improvements in agricultural implements and more particularly to such as are known in the art as pulverizing, this application being a division of application filed by me on the 22nd day of June, 1921, and designated by Serial No. 479,610.

One object of my present invention is to so construct a pulverizer having a roller comprising disks mounted on a shaft, that the disks comprising said roller may be readily assembled or dis-assembled.

With this and other objects in view, the invention consists in certain novel features of construction and combinations of parts as hereinafter set forth and pointed out in the claims.

In the accompanying drawings; Figure 1 is a view in side elevation of a pulverizer in which my improvements are embodied; Figure 2 is a view, partly in elevation and partly in section illustrating the structure of one of the rollers and means for mounting the shaft thereof, and Figure 3 is a view showing one of the sectional disks.

The main frame of the implement may comprise parallel beams 1, 1, suitably spaced apart and connected by depending brackets such as shown at 2. Draft beams such as indicated at 3 may be secured to the frame and carry a draft attaching member 4.

To each depending bracket 2, a secondary frame 5 is pivotally connected.

Bearing boxes 6, are suitably mounted near respective ends of each secondary frame for the accommodation of shafts 7 of rollers 8, 9,—each of the latter comprising hollow disks 10 and 11,—the disks of the front roller 8 being larger in diameter than the disks of the rear roller 9. The disks of each roller are made hollow and provided with peripheral earth-engaging portions which are tapering or approximately V-shaped in cross section. The disks 10 of each roller are provided with web portions 12 on which hubs 13 are formed, the latter being mounted on the shaft 7 of the roller, and side edges of the disks 10 are provided with annular flanges 14. The disks 11, which alternate with the disks 10, are made each in two parts $11^a$, $11^a$ and these parts are provided at their side edges with laterally projecting flanges 15 which, when the disks are assembled, are embraced by the annular flanges 14 of the disks 10 and thus the two-part disks 11 are supported by and between the disks 10. By constructing the disks as above explained, they can be readily assembled or disassembled. The disks of each roller and the bearing boxes are held in place on the shafts 7 by means of nuts 16 screwed on threaded shanks 17 at the ends of each of said shafts and engaging the bearing boxes 6, and the use of bolts for securing the disks together is obviated. The threads of the shanks 17 are such as to provide adjustment for variations in the width of the disks and lengths of the bearing boxes, when the nuts 16 are turned. It will be observed that by unscrewing the nut 16 at one end of one of the shafts 7, the disks may be so moved on the shaft as to free the flanges of the disks 10 from the flanges of the two-part disks 11, so that the latter may be readily removed. The nuts 16 may be held in the positions to which they may be adjusted, by means of jam nuts $17^a$. The bearing boxes 6 are threaded as shown at 18, and these portions are engaged by internally threaded caps 19 which bear against the secondary frames 5. The caps not only enclose the outer ends of the bearing boxes and threaded ends of the shafts and the nuts thereon, but they also afford means of adjustment to provide for variations between the length of the shaft and disk assemblies and the distance between the secondary frames. It will also be seen that by turning the threaded caps 19, at the ends of one of the rollers, the assembly may be so adjusted that the disks thereof may be made to bear proper alternate relation to the disks of the other roller. To hold the parts in proper adjustment, the caps 19 may be secured to the bearing boxes 6 by means of set screws 20.

Having fully described my invention what I claim as new and desire to secure by Letters-Patent is:—

1. A pulverizing roller comprising a shaft and two sets of disks, the disks of one set mounted on said shaft and alternating with the disks of the other set, the disks of the last-mentioned set each comprising a plurality of parts having interlocking connection with the disks of the first-mentioned set.

2. In an implement of the character described, the combination with supporting means, of a pulverizing roller comprising a shaft mounted in said supporting means, a set of disks mounted on said shaft, and multi-part disks disposed between the first-mentioned disks and having interlocking relation thereto.

3. In an implement of the character described, the combination with supporting means, of a pulverizing roller comprising a shaft, a set of disks mounted thereon and having annular flanges, and a second set of disks alternating with the first mentioned disks, the disks of said second set each comprising a plurality of parts having lateral flanges underlying the annular flanges of the first-mentioned disks.

In testimony whereof, I have signed this specification in the presence of two subscribing witnesses.

WILLIAM D. DEWEND.

Witnesses:
  JENNIE M. DAVIS,
  EMMA ULLERY.